United States Patent
Massingill et al.

[11] Patent Number: 5,933,418
[45] Date of Patent: Aug. 3, 1999

[54] METHOD FOR INCREASING CONTROL CHANNEL CAPACITY IN A COMMUNICATION SYSTEM

[75] Inventors: Larry William Massingill, Selma; Torbjörn Wilson Sölve, Cary, both of N.C.

[73] Assignee: Ericsson Inc., Research Triangle Park, N.C.

[21] Appl. No.: 08/749,236

[22] Filed: Nov. 15, 1996

[51] Int. Cl.⁶ ..................................... H04B 7/005
[52] U.S. Cl. ..................... 370/321; 370/337; 370/522
[58] Field of Search ................................. 370/321, 328, 370/318, 330, 337, 345, 347, 522, 528, 503, 509, 465, 523, 524; 375/299, 347, 202; 455/515, 434, 69, 115, 67.1

[56] References Cited

U.S. PATENT DOCUMENTS

| | | | |
|---|---|---|---|
| 4,905,235 | 2/1990 | Saburi | 370/318 |
| 4,942,570 | 7/1990 | Kotzin et al. | 370/330 |
| 5,327,576 | 7/1994 | Uddenfeldt et al. | 370/333 |
| 5,513,183 | 4/1996 | Kay et al. | 370/337 |
| 5,581,548 | 12/1996 | Ugland et al. | 370/330 |
| 5,648,967 | 7/1997 | Schulz | 370/347 |
| 5,805,646 | 9/1998 | Wang | 370/503 |

FOREIGN PATENT DOCUMENTS

| | | |
|---|---|---|
| 0536099 | 4/1993 | European Pat. Off. . |
| 2253972 | 9/1992 | United Kingdom . |

*Primary Examiner*—Chau Nguyen
*Attorney, Agent, or Firm*—Burns, Doane, Swecker & Mathis, L.L.P.

[57] ABSTRACT

A method for increasing the control channel capacity of a control station in a communications system. According to the method, in an idle mode of operation, a mobile station receives and processes data during more than one time slot per frame. As a result, additional channel structures are made possible such that additional data can be broadcast to a mobile station without restructuring a conventional slot format.

12 Claims, 4 Drawing Sheets

| 0 | 1 | 2-5 | 6-9 | 10-13 | 14-17 | 18-21 | 22-24 | 25 | 26-29 | 30-33 | 34-37 | 38-41 | 42-45 | 46-49 | 50 |
|---|---|---|---|---|---|---|---|---|---|---|---|---|---|---|---|
| H | S | BCCH | CCCH | CCCH | CCCH | CCCH | I | H | CCCH | CCCH | CCCH | CCCH | CCCH | CCCH | H |

| 51-54 | 55-58 | 59-62 | 63-66 | 67-70 | 71-74 | 75 | 76-79 | 80-83 | 84-87 | 88-91 | 92-95 | 96-99 | 100-101 |
|---|---|---|---|---|---|---|---|---|---|---|---|---|---|
| CCCH | CCCH | CCCH | CCCH | CCCH | CCCH | H | CCCH | CCCH | CCCH | CCCH | CCCH | CCCH | I |

PRIMARY CONTROL CHANNEL, SLOT 0

| 0-5 | 6-24 | 25-43 | 44-62 | 63-81 | 82-100 | 101 |
|---|---|---|---|---|---|---|
| I | HPA0 | HPA1 | HPA2 | HPA3 | HPA4 | I |

HIGH MARGIN PAGING CHANNEL
PRIMARY CARRIER SLOTS 2-6 OR OTHER CARRIER SLOTS 2-6

I : IDLE (NO BURST)
H : HIGH POWER SYNC BURSTS/BCCH DATA
S : SYNCHRONIZATION CHANNEL
CCCH : COMMON CONTROL CHANNEL
HPAn : HIGH POWER ALERT CHANNELS (0-4)

IMPROVED CONTROL CHANNEL STRUCTURE (102 FRAMES)

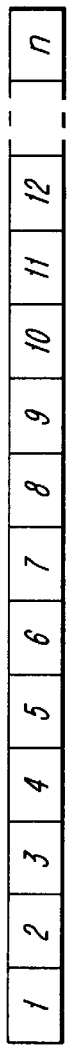
Fig. 1
PRIOR ART
DIVISION OF CARRIER INTO FIXED LENGTH TIME PERIODS 1-n
Fig. 2
PRIOR ART
DIVISION OF EACH m SLOTS INTO FRAMES
Fig. 3
PRIOR ART
GSM CONTROL FRAME MULTI-FRAME

| 0 | 1 | 2-5 | 6-9 | 10-13 | 14-17 | 18-21 | 22-24 | 25 | 26-29 | 30-33 | 34-37 | 38-41 | 42-45 | 46-49 | 50 |
|---|---|---|---|---|---|---|---|---|---|---|---|---|---|---|---|
| H | S | BCCH | CCCH | CCCH | CCCH | CCCH | I | H | CCCH | CCCH | CCCH | CCCH | CCCH | CCCH | H |

| 51-54 | 55-58 | 59-62 | 63-66 | 67-70 | 71-74 | 75 | 76-79 | 80-83 | 84-87 | 88-91 | 92-95 | 96-99 | 100-101 |
|---|---|---|---|---|---|---|---|---|---|---|---|---|---|
| CCCH | CCCH | CCCH | CCCH | CCCH | CCCH | H | CCCH | CCCH | CCCH | CCCH | CCCH | CCCH | I |

ACeS CONTROL CHANNEL, SLOT 0

Fig. 4
PRIOR ART

| FRAME n | | | | | | | | FRAME n+1 | | | | | | | |
|---|---|---|---|---|---|---|---|---|---|---|---|---|---|---|---|
| 0 | 1 | 2 | 3 | 4 | 5 | 6 | 7 | 0 | 1 | 2 | 3 | 4 | 5 | 6 | 7 |
| R | | | | R' | | | | R | | | | R' | | | |
| NORMAL XMT WINDOW | | | | | | | | NORMAL XMT WINDOW | | | | | | | |

R : NORMAL RECEIVE TIME    R' : ADDITIONAL RECEIVE TIME    0-7 : TDMA TIME SLOT
EXAMPLE OF POSSIBLE EXTRA RECEIVE ONLY TIME SLOTS IN A TDMA FRAME

Fig. 5

| 0 | 1 | 2-5 | 6-9 | 10-13 | 14-17 | 18-21 | 22-24 | 25 | 26-29 | 30-33 | 34-37 | 38-41 | 42-45 | 46-49 | 50 |
|---|---|---|---|---|---|---|---|---|---|---|---|---|---|---|---|
| H | S | BCCH | CCCH | CCCH | CCCH | CCCH | I | H | CCCH | CCCH | CCCH | CCCH | CCCH | CCCH | H |

| 51-54 | 55-58 | 59-62 | 63-66 | 67-70 | 71-74 | 75 | 76-79 | 80-83 | 84-87 | 88-91 | 92-95 | 96-99 | 100-101 |
|---|---|---|---|---|---|---|---|---|---|---|---|---|---|
| CCCH | CCCH | CCCH | CCCH | CCCH | CCCH | H | CCCH | CCCH | CCCH | CCCH | CCCH | CCCH | I |

PRIMARY CONTROL CHANNEL, SLOT 0

| 0-5 | 6-24 | 25-43 | 44-62 | 63-81 | 82-100 | 101 |
|---|---|---|---|---|---|---|
| I | HPA0 | HPA1 | HPA2 | HPA3 | HPA4 | I |

HIGH MARGIN PAGING CHANNEL
PRIMARY CARRIER SLOTS 2-6 OR OTHER CARRIER SLOTS 2-6

I : IDLE (NO BURST)
H : HIGH POWER SYNC BURSTS/BCCH DATA
S : SYNCHRONIZATION CHANNEL
CCCH : COMMON CONTROL CHANNEL
HPAn : HIGH POWER ALERT CHANNELS (0-4)

IMPROVED CONTROL CHANNEL STRUCTURE (102 FRAMES)

Fig. 6

METHOD FOR INCREASING CONTROL CHANNEL CAPACITY IN A COMMUNICATION SYSTEM

FIELD OF THE INVENTION

The present invention relates generally to control channels in a communication system. More particularly, the present invention provides a method for increasing control channel capacity to allow the transmission of increased control data from a control station (e.g., a mobile station or satellite) to a transmitter/receiver (e.g., a mobile station).

BACKGROUND OF THE INVENTION

In a cellular telephone system, service is provided to cellular telephones by providing many adjacent geographic areas, called cells, each of which is served by a control station called a base station. Each base station provides a broadcast control channel to provide service to all idle, authorized cellular terminals within the boundaries of the cell, as well as sufficient transmit/receive carrier pairs to support some number of active mobile terminals. One of the primary functions of the mobile terminal in idle mode is to monitor the control carrier within the cell in which it resides. This carrier contains cell specific information (broadcast information) required by the mobile terminal to operate within the cell, as well as messages directed to specific terminals to inform them of incoming calls. These messages are commonly known as pages, and usually result in the ringing of the terminal and eventual establishment of an active connection between the terminal and the calling party.

In Time Division Multiple Access (TDMA) cellular systems, such as the well-known IS-136 (D-AMPS) and ETSI GSM systems, the control channel is one of multiple independent channels on a single carrier frequency. In TDMA systems, carriers are divided in time into fixed intervals known as time slots, as shown in FIG. 1. Each time slot carries a burst of data encoded in the R.F. signal.

These time slots are numbered sequentially in time, and those slots repeating at some fixed integral number of slots (m) comprise what is known as a channel. The repeating interval containing m slots is known as a frame, and slots within the frame are numbered 0,1, . . . m−1, as shown in FIG. 2.

In conventional TDMA systems, the mobile terminal receives and transmits only during the period of one time slot (channel) per frame. Frames and time slots are numbered in the same way for both receive and transmit, but the time reference is shifted between them so that the terminal does not have to receive and transmit at the same time. This eliminates the need for a costly and complex duplexer, a device that allows the same antenna to be used for transmit and receive at the same time.

The control channel in a TDMA system is carried on one time slot on a single carrier. On the control channel, there are two types of data. The first type of data is cell-specific information, which includes synchronization and timing information, and cell-specific broadcast control information. The second type of data is mobile-targeted data such as pages and messages used in call setup when establishing an active connection with a mobile terminal. A typical control channel structure consists of a repeating series of frames, known as a multi-frame. The control frame structure used in GSM, for example, is shown in FIG. 3.

In FIG. 3, the bursts F are frequency correction bursts (1 time slot each). Bursts S are synchronization bursts (also 1 time slot each). Bursts BCCH carry broadcast control channel data (messages encoded over 4 time slots), and bursts CCCH carry common control channel data (also messages encoded over 4 time slots). Bursts I are idle bursts of 1 time slot each. This structure exists in time slot 0 of the control carrier in a GSM cell. The components are utilized as follows.

The Frequency Correction Burst is a burst of fixed frequency (no data content) modulating the carrier frequency, and occurs 5 times in the 51 frame structure. Its purpose is to aid the mobile terminal in locating the control carrier in a cell when it does not know the frequency of the carrier, and to provide initial frequency synchronization between the mobile and the cell. The mobile terminal will typically scan possible carrier frequencies for this fixed frequency burst (after demodulation). Once found, the terminal knows it has found a GSM carrier frequency and can make a coarse frequency adjustment based on this signal. It also knows the rough (coarse) timing of time slot 0 in the frame, as this burst always occurs on time slot 0.

The Synchronization Channel burst contains information on the timing structure of the cell (frame numbering) and additional synchronization information to allow fine frequency and timing adjustment. It identifies its own frame number within the 51 frame multi-frame structure, as well as which occurrence of the multi-frame structure is currently being transmitted. The terminal receives this burst in the frame following the receipt of the frequency correction burst.

The Broadcast Control Channel contains information about the cell that the terminal must have to communicate with the cellular system from within the cell. The channel carries blocks of data (messages) coded over four sequential frames in four bursts. Up to 8 such messages are required to carry the entire data content of the broadcast control channel. The messages are thus numbered from 1 to 8, and identified by taking the occurrence number of the multi-frame, derived from the synchronization channel, modulo 8.

The Common Control Channels contain messages coded over four frames, as with the broadcast control channel. These channels carry the messages targeted to specific mobile terminals, such as pages. There are several channels allocated, and each mobile terminal receives only one channel. The mobile determines which channel to receive based on data obtained from the broadcast control channel and its own internal identification number, known to itself and the cellular system, by which it is paged.

When there is sufficient capacity to support all mobile terminals in a cell with a single control channel structure, the structure above is used on time slot 0. If additional paging capacity is required, the above channel structure can be repeated on other channels (time slots) on the control carrier, but with the frequency correction burst and the synchronization burst excluded. In this case, the mobile terminal will initially receive the channel on time slot 0 to synchronize to the system, but may then monitor the control information on one of the other time slots for broadcast and other information. Synchronization is maintained on these channels by the process of decoding the broadcast information and common control channels. The terminal is not required to monitor more than one time slot at a time. Further details of conventional control channels are described in the ETSI GSM specification, part 5, sections 01 and 02, and in D-AMPS specification IS-136, which are incorporated by reference.

In communications systems where very low signal levels are expected at the mobile terminal, new requirements are placed on the control channel. Such a concern arises in satellite based systems, where distance and restrictions on available peak and average transmitter power must be accommodated. At low signal levels, the amount of signal blockage (by the head, body, trees or other obstructions) that can be accommodated before the signal level at the receiver is insufficient to allow correct reception of the signal is very small. While the user can assist in assuring a good signal path when in active mode (while establishing or maintaining a call), user assistance cannot be expected when the terminal is idle. Such a terminal is said to be disadvantaged when it is attempting to receive a signal below the threshold required for successful reception at normal signal levels. In such systems, a means for providing a boosted signal for synchronization and paging functions has been devised.

In this method, some bursts on the control channel are transmitted at higher power and with additional coding to achieve greater likelihood of being received successfully by the terminal when it is disadvantaged. A control channel of this type, as described in the ACeS air interface specification, is shown in FIG. 4.

In FIG. 4, H designates a high power burst, S designates a synchronization burst (1 time slot), BCCH designates broadcast control channel data (messages encoded over 4 time slots), CCCH designates common control channel data (messages encoded over 4 time slots), and I designates an idle burst.

In this channel structure the multi-frame is 102 frames long. All bursts on the channel are transmitted at the same power level, except for the four high power bursts, which are transmitted at a level of about 7 db over the other bursts. This characteristic allows the mobile terminal to locate the carrier containing the control channel by measuring the energy over time on a possible carrier frequency, and looking for the unique pattern or "power profile" presented by the four high power bursts. The asymmetrical nature allow the mobile to obtain both coarse timing for the location of the time slots of the channel, as well as determine which burst is associated with frame 0 of the channel. This replaces the function of the frequency correction burst in GSM.

The first high power burst in this channel also has the unique characteristic of providing a known data sequence, which the terminal can decode and use to obtain fine frequency and timing adjustment. The other three high power bursts are used to carry highly coded data. Coding provides an additional 12 dB of gain over the other bursts on the channel, giving these bursts an effective signal strength (as perceived by the terminal) of approximately 20 db above the remainder of the channel. This coding, however, reduces the effective data capacity per burst from 46 bits/burst for the normal power bursts to 7 bits/burst for the high power bursts.

In a system utilizing this control channel structure, there may be many such control carriers transmitted using the same power source. An example would be a satellite providing coverage to many cells on the earth (also known as beams), each with its own control carrier. In order to limit the peak power requirement for the power source, it is desirable to have only one high power burst being transmitted at any one time across all the beams being fed by the same power source. With this structure, by staggering the start time of the multi-frame between beams, there are 25 staggers in which no two beams are transmitting a frame containing a high power burst at the same time. With a frame structure containing 8 time slots, as in GSM, and by further staggering the timing between beams on slot intervals, there are 8 times 25, or 200 possible staggers between beams that result in no two beams transmitting a high power burst at the same time.

In this system, the disadvantaged mobile terminal receives page messages coded on the high power bursts. To receive broadcast information, it must become advantaged (move to a good receiving position) before it can receive the broadcast channel. It must also become advantaged to establish and maintain an active connection.

In the above systems, specifically when addressing the mobile terminal in a low signal system such as a satellite based system, there are two characteristics that are undesirable. First, the data carrying capacity of the high power bursts is very low, limiting the number of mobile terminals that may be paged per second in a beam when this is the primary paging method. Second, the mobile terminal must become advantaged in order to read the broadcast information on the channel. Although this data changes infrequently, current information is necessary in order to establish an active connection. This means that when a terminal receives a page and the user moves to an advantaged position, the terminal must first verify the accuracy of the broadcast data it last read by rereading the broadcast data from the channel before attempting to establish the connection. This results in a delay in the set up of the call.

As described above, a broadcast control channel is transmitted by each control station (e.g., base station or satellite beam), and is monitored by all idle mobiles in the service area associated with a particular control station. The ACeS satellite phone system, which is based on the GSM air interface standard, includes a broadcast control channel which preferably has synchronization and data-carrying capacity requirements in addition to the requirements of the GSM broadcast control channel. In the ACeS system, the BCCH preferably has the following additional qualities beyond the BCCH in the GSM system:

1. The BCCH can be transmitted at a "boosted" level (at an increased power level) to reach disadvantaged terminals (i.e., mobiles that cannot monitor the normal-power BCCH due to signal blockage).

2. The boosted signal allows the terminal to synchronize to the channel, provide common broadcast information to the terminal, and provide a terminal-specific call alerting function.

3. The terminal can preferably monitor both the boosted signal and the normal signals when not disadvantaged.

4. The transmission of boosted signals in the system is preferably distributed such that a maximum transmission power is not exceeded.

In ACeS, one channel on the control carrier provides synchronization and low data rate information to disadvantaged terminals. Since the data rate on this channel is too slow to meet the data rate requirements for boosted power alerting, it is desirable to provide and additional channel for this purpose.

In the GSM system, the terminal receives only one channel at a time, thereby preventing the terminal from receiving sufficient data to meet the above requirements.

SUMMARY OF THE INVENTION

It is an object of the present invention to provide a means to increase the number of time slots received by a mobile station to increase the data available to the mobile station without the addition of a costly and complex duplexer to the mobile terminal.

It is another object of the present invention to provide a means to vary the time slot received by the mobile station from frame to frame.

It is another object of the present invention to provide a means to receive control channel information on time slots transmitted on different carrier frequencies, to thereby improve the ability of a satellite communication system to service a large number of terminals within a beam.

It is yet another object of the present invention to increase the number of high power bursts on a control channel carrier without comprising the ability of a mobile terminal to achieve coarse synchronization using the power profile method.

It is still another object of the present invention to increase the number of high power bursts on a control channel carrier without compromising the ability to stagger the timing of high power bursts between control channel carriers in multiple beams in a satellite-based communication system, such that a minimum number of high power bursts will be transmitted at any one time across all beams.

The present invention achieves the above objects, and provides additional advantages, by allowing a transmitter/receiver (e.g., a mobile unit) to receive an increased amount of control data from a control station (e.g., a base station or satellite) during an idle mode of operation. According to the method of the present invention, a mobile station operating in an idle mode receives and processes control data during multiple time slots in a frame. The multiple control slots per frame in the idle mode can be transmitted on multiple synchronized carrier frequencies. As a result, additional channels or types of data can be broadcast to the mobile station without restructuring the slot format. A new control channel structure, such as the control channel structure embodied in the ACeS Air Interface specification, can be created.

According to further aspects of the present invention, high margin bursts are provided in a communication system control channel which allow a terminal to synchronize to a beam. The high margin bursts also provide paging, system information, and message services to disadvantaged terminals. The control channel meets all of the above-mentioned desirable qualities for an ACeS control channel.

BRIEF DESCRIPTION OF THE DRAWINGS

The present invention can be understood more fully by reading the following Detailed Description of the Preferred Embodiments together with the accompanying drawings, in which like reference indicia are used to designate like elements, and in which:

FIG. 1 is a diagram showing the division of a carrier into fixed-length time slots according to conventional TDMA principles;

FIG. 2 is a diagram showing the organization of multiple slots into frames in a conventional TDMA system;

FIG. 3 is a diagram showing the structure of a conventional control channel multiframe according to the GSM standard;

FIG. 4 is a diagram showing the structure of a control channel according to the ACeS air interface specification;

FIG. 5 is a diagram illustrating one example of using extra receive only time slots in a TDMA frame according to the present invention; and FIG. 6 shows one example of an improved control channel structure made possible by the use of additional receive only time slots as in FIG. 5.

DETAILED DESCRIPTION OF THE PREFERRED EMBODIMENTS

Figure 7:
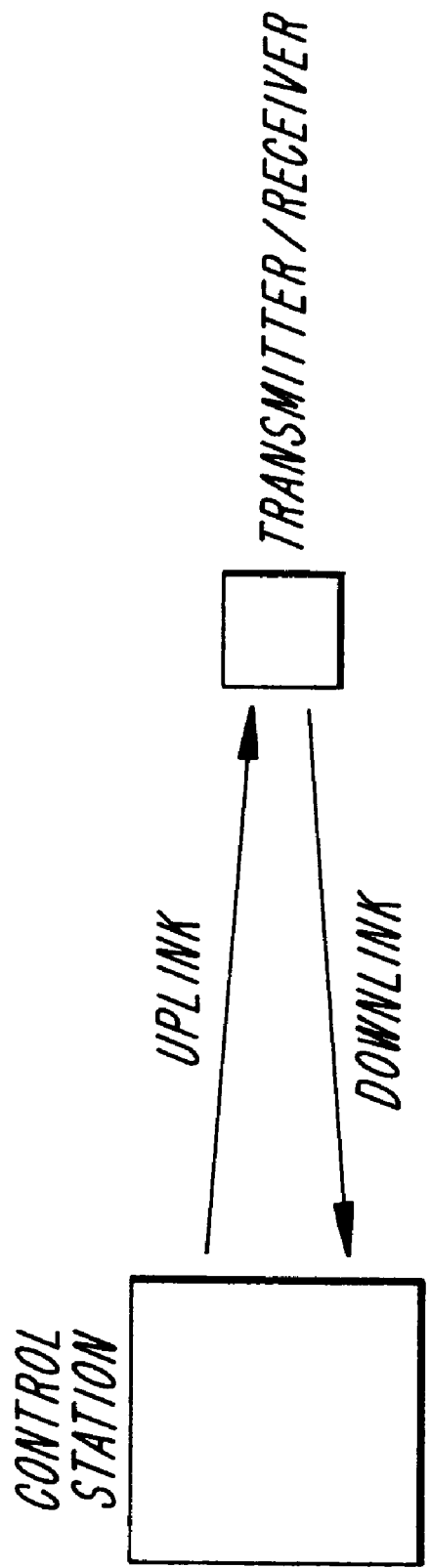
FIG. 7 shows a block diagram demonstrating a control station and transmitter/receiver that engage in uplink and downlink transmission according to the present invention.

Referring now to FIG. 5, a slot and frame arrangement according to an exemplary implementation of the method of the present invention is shown. As shown, in addition to the normal receive slots R, additional receive slots R' are provided in each frame during intervals when the transmitter/receiver is in idle mode. During intervals when the transmitter/receiver is in an active mode (such as when the transmitter/receiver is exchanging voice signals with the control station), the transmitter/receiver is receiving and transmitting communication signals, the transmitter is enabled during the portions of each frame labeled "Normal XMT window". Accordingly, receiving signals during the normal transmission windows is not possible unless the transmitter/receiver includes a duplexer to allow for simultaneous reception and transmission on the same antenna. During the idle mode, when the transmitter/receiver waits and scans for paging or other messages from the control station, the terminal need only receive signals, and can therefore receive during the additional time slots R', including the normal transmission window time slots.

Alternatively, the transmitter/receiver can receive only one slot of control information per frame (see FIG. 7), but means can be provided within the transmitter/receiver and/or the control station to vary the receive time slot from frame to frame.

Information transmitted to the transmitter/receiver from the control station (see FIG. 7) during the additional slots R' can be transmitted at the same frequency as control information transmitted during the normal receive slots R. Alternatively, the information transmitted to the transmitter/receiver from the control station on carrier signals at different frequencies, where the carrier signals are synchronized to a common timing reference signal. It will be appreciated that where the carrier signals are of different frequencies, it is desirable to provide sufficient time between a normal receive slot R and the additional receive slots R' in each frame to allow the transmitter/receiver to adjust its reception frequency between bursts, which may limit the use of slots located adjacent to the normal receive slots R and the additional receive slots R'.

As a result of the expanded control channel capabilities, new control channel structures are possible. For example, a control channel structure can be created, an example of which is shown in FIG. 6. As seen in the Figure, the primary control channel on slot 0 includes high power bursts H which contain high power sync bursts or BCCH data, and which are transmitted during frames 0, 25, 50, and 75. Idle bursts I occur during frames 22–24, and 100–101. Common control channel information occurs during frames 6–21, 26–49, 51–74, and 76–99 in four-frame interval. Finally, broadcast control channel information is transmitted in the four-frame interval of frames 2–5. It will be appreciated that this control channel structure on slot 0 is identical to the control channel structure shown in FIG. 4.

This arrangement of the control channel allows a high margin paging channel to be added as needed. The high margin paging channel is broadcast from the control station to one or more associated transmitter/receivers over any or all of slots 2–6 on the primary control channel carrier or other carrier synchronized to the primary control channel carrier. During 19-frame intervals from frames 6–100, four high power alert channels HPAn are broadcast over the high margin paging channel.

The four high power bursts on slot 0 (the primary control channel) provide coarse and fine synchronization, and low data rate transmission. However, the paging of disadvantaged terminals is performed over the high power alert channels HPAn, which as mentioned above is located on a different time slot which can be on the same or different carrier as the primary control channel. This allocation of the paging function allows increase paging data capacity, from the limited capacity of the four high power bursts to a virtually unlimited number of bursts using multiple time slots and multiple carriers. In this embodiment, the four high power bursts are used for synchronization and to carry a high-power version of the broadcast control channel data (the same data as is carried on the normal-power BCCH in a conventional system). This high-power BCCH data is, using the method of the present invention, receivable by disadvantaged transmitter/receivers.

Even if the high power alert channels HPAn are transmitted on the primary control channel carrier, the power profile method can still be used by the transmitter/receiver to detect and synchronize to the carrier, since the power profile (e.g., the pattern of high power slots) of slot 0 is unchanged from a conventional control channel. In this situation, a transmitter/receiver terminal will make power measurements looking for the four-slot pattern, and will reject slot positions which do not present this pattern (including the HPA slots). In the example of FIG. 6, time slots 1 and 7 are excluded from use as HPA channels in order to facilitate the identification of the four-slot pattern on slot 0. It will be appreciated that other implementations are possible in which slots 1 and 7 can be used as HPA channels.

During the idle mode of operation, a disadvantaged transmitter/receiver (e.g., a mobile terminal inside a building or subject to significant interference) maintains fine synchronization by regularly receiving the high power burst in frame 0, slot 0. The remaining three high-power bursts on slot 0 are used by the terminal to maintain current broadcast control channel data. A portion of this broadcast control channel data indicates to the terminal which high power alert channel HPAn (including time slot, channel, and possibly carrier frequency if the HPA channels are on different carriers than the primary control carrier) the terminal must monitor to receive pages. Preferably, the terminal will monitor only one HPA channel, and all pages directed to a particular terminal will be transmitted over its assigned HPA channel. The terminal will receive both time slot 0 and the time slot of its assigned HPA channel during a multiframe. In some frames, depending upon the location of the HPA channel, the terminal may be required to receive two time slots during a single frame.

If a terminal is not disadvantaged, the terminal will receive additional data from time slot 0, including the normal broadcast control channel BCCH, the synchronization channel SCH, and possibly one of the common control channels CCCH as an ancillary paging channel to a high power alert channels HPA.

It will be appreciated that the method of the present invention allows the number of high power bursts transmitted simultaneously between beams in a satellite-based communication system to be limited. For example, in the above-described embodiments, 25 unique frame timing arrangements (stagger patterns) between beams can be accommodated. When multiplied by 8 slots per frame, this allows a total of 200 unique staggers to support up to 200 beams without requiring the simultaneous transmission of multiple high power bursts.

If limitations of the control station prevent the transmission of many simultaneous high power bursts across multiple beams, the number of simultaneous high power bursts can be minimized in a structured manner. By arranging the staggers between beams so that one or more time slots in an 8 slot repeating sequence is never used for time slot 0 in a control channel, at least one slot in every beam, which could be used to contain HPA channels, will never be in use for high power bursts in other beams. Utilizing this slot for HPA channels, and assigning non-overlapping HPA channels on this slot between beams or scheduling paging messages to prevent simultaneous transmission between beams, the number of simultaneous high power bursts required can be reduced to as little as, or managed to never exceed, some required threshold.

Since each time slot in the system can support up to 5 HPA channels, and there are 8 slots per frame, then the system can be provided with 40 HPA channels if one high power burst is provided in virtually every time slot. In a satellite-based system having 150 beams, allowing 1 HPA channel per beam will require at most 6 high power bursts to be transmitted simultaneously. Such a scheme will have five overlapping sets of HPA channels of 40 channels each, plus ten additional channels (the two free time slots multiplied by the five HPA channels), along with 150 sets of synchronization bursts. Six simultaneous bursts can provide up to 170 HPA channels; excess HPA channels can be added to beams requiring additional paging capacity.

It will be appreciated that the foregoing method provides a relatively simple means for managing the arrangement of each HPA channel in time within the beams of a satellite-based communications system, by allowing both the time slot and placement within the frame to be selected independently for each beam. This guarantees that the maximum number of simultaneous high power burst transmissions permissible by the system will not be exceeded.

Alternatively, the three high-power bursts in time slot 0 can be used for both broadcast data and paging information in beams where only relatively limited paging capacity is necessary. This alternative eliminates the need to provide an HPA channel for every beam and can lower the number of simultaneous high power bursts. The paging configuration for such a beam can be identified in the broadcast control information.

Another alternative to minimize the number of simultaneous high power bursts in a beam is to delay paging messages to some terminals when multiple messages would otherwise be transmitted simultaneously. When the full capacity of the affected HPA channels is not required, this alternative would allow the maintenance of a lower peak power requirement at the transmitter.

The foregoing description is for explanatory purposes only; therefore, the numerous details and specificities contained in the description should not be construed as limitations of the invention. Those of ordinary skill in the art will easily recognize that many modifications to the disclosed illustrative embodiments can be made which are within the spirit and scope of the invention. Therefore, the invention is not defined by the above description, but by the following claims and their legal equivalents.

What is claimed is:

1. A method for transmitting data from a control station to a transmitter/receiver in a TDMA communications system, comprising the steps of:

during a transmitter/receiver active mode, transmitting control data from the control station to the transmitter/receiver during a first time slot of each TDMA frame; and during a transmitter/receiver idle mode, transmitting control data from the control station to the transmitter/receiver during a first time slot and a second time slot of each TDMA frame, with the second time slot being a time slot during which the transmitter/receiver receives and transmits traffic signals when the transmitter/receiver is in the active mode.

2. The method of claim 1, wherein the second time slot and the first time slot are separated by one half of a TDMA frame.

3. The method of claim 1, wherein the first time slot is transmitted on a first carrier frequency, and the second time slot is transmitted on a second carrier frequency, wherein the first and second carrier frequencies are synchronized.

4. The method of claim 3, wherein the first time slot and the second time slot are sufficiently separated to allow the transmitter/receiver to adjust its receiver frequency from the first carrier frequency to the second carrier frequency.

5. The method of claim 1, wherein the data includes control channel data.

6. The method of claim 1, further comprising the step of transmitting control channel data during the idle mode on a channel comprised of the first and second slots of each of a plurality of TDMA frames.

7. The method of claim 6, wherein the first and second slots are not adjacent.

8. The method of claim 1, wherein the transmitter/receiver is a mobile terminal and the control station is a satellite.

9. A method for transmitting communication information from a control station to a transmitter/receiver in a TDMA communication system, comprising the steps of:

transmitting control information over a primary control channel comprised of one time slot from each of a plurality of TDMA frames, the primary control channel including common control channel information and original broadcast control channel information transmitted at a first power level, and a version of the original broadcast control channel information at a second power level; and transmitting paging information over one or more paging channels comprised of one or more other time slots from each of a plurality of TDMA frames.

10. The method of claim 9, wherein the paging channels are transmitted on the same carrier as the primary control channel.

11. The method of claim 9, wherein the transmitter/receiver is a mobile terminal and the control station is a satellite.

12. The method of claim 9, wherein the one or more paging channels are transmitted on one or more different carriers than the primary control channel, and further comprising the step of determining, at the transmitter/receiver, the different carrier associated with the transmitter/receiver from the version of the original broadcast control channel information.

* * * * *